United States Patent Office 3,492,817
Patented Feb. 3, 1970

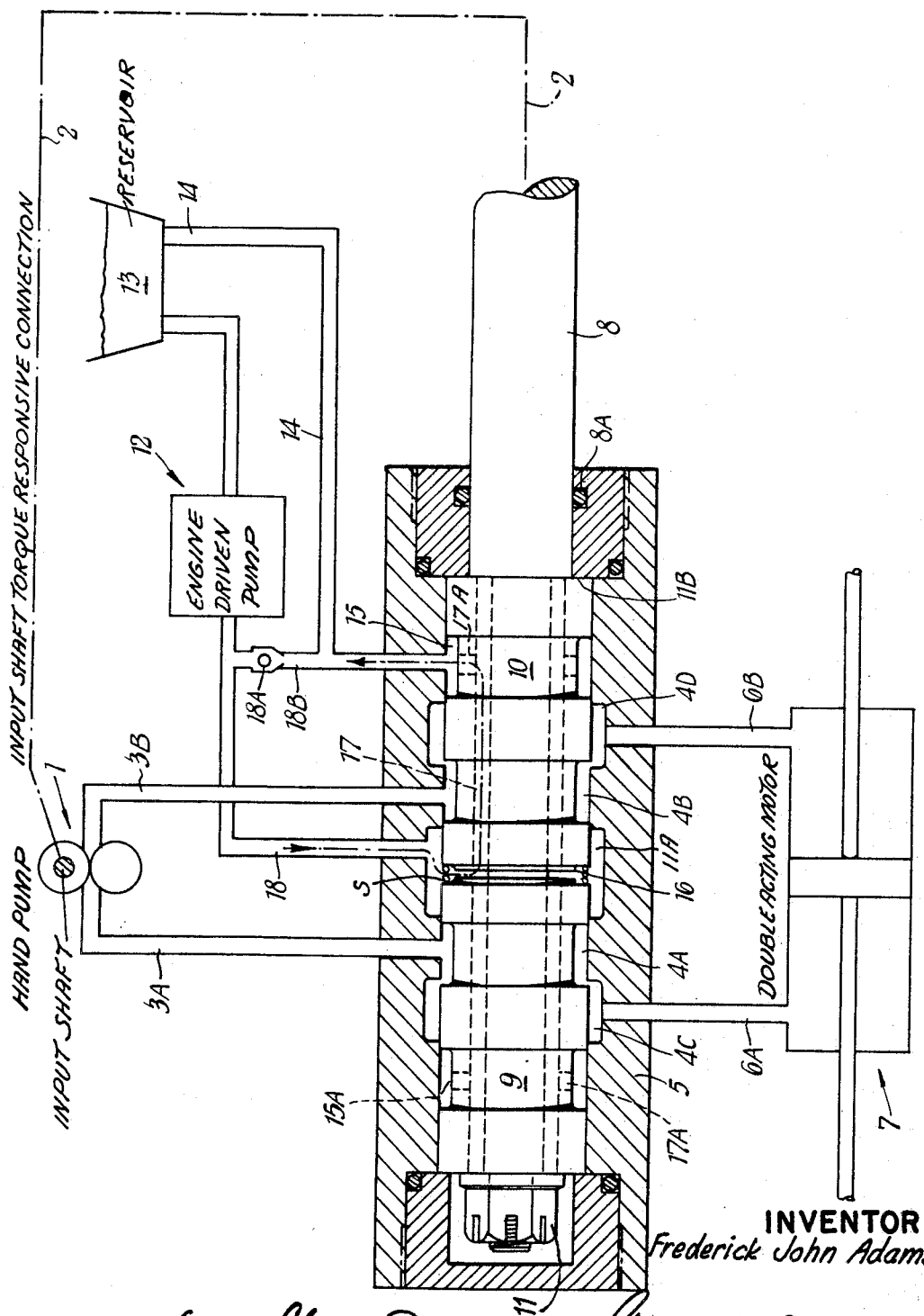

3,492,817
SPOOL VALVES AND POWER STEERING AND
LIKE CONTROLS
Frederick John Adams, Campton, near Shefford, England, assignor to Cam Gears Limited, Hitchin, England, a British company
Filed Mar. 21, 1968, Ser. No. 714,859
Claims priority, application Great Britain, Mar. 22, 1967, 13,365/67
Int. Cl. F15b 15/18
U.S. Cl. 60—52                                   16 Claims

ABSTRACT OF THE DISCLOSURE

A steering or like reversible fluid-power system of the kind in which there is a reversible manual pump, a power pump and valve means directing power-pressure in one or other directional sense to a double-acting servomotor, is provided with a spool-valve control which is normally pressure-centered, and the movements of which are determined by manually applied torque. The spool valve is divided into two spools which, by their relative movement, exercise fluid control.

---

This invention relates to spool valves and to power steering and like control systems which, in operation, involve the use of a spool valve which moves in one or other sense of direction according to the sense of direction of steering (or like two-way control function). The invention is particularly concerned with steering systems having both hand-pump and power-pump supplies and in which torque imposed by an operator in one sense or the other to a steering-wheel or equivalent control causes a flow of pressure fluid in corresponding sense to a double-acting servomotor. For brevity, the invention will be stated and referred to hereinafter, in the context of a power-assisted hydraulic steering system. The invention includes a spool valve which involve features rendering it applicable to hydraulic or pneumatic systems quite different from the steering system described herein, when kindred requirements are to be met.

As applied to a steering system the invention seeks to afford the usual requirements of such systems with economy, safety, and operational precision; to provide for minor control-movements being preformed by the operator only, and to provide that there is a force feed-back from the road wheels which, whether or not power assistance is operating, gives the operator a measure of "feel."

The invention resides in a spool valve and in a power-assisted steering or like control system including such valve.

According to the invention, a spool valve comprises a fixed valve housing having lands and grooves therein complementary to lands and grooves of spool means slidable therein, in which the spool means is relatively slidable on a valve rod which is itself borne for sliding in the housing, and by such relative sliding controlling fluid flow between grooves of the valve and a passage within the spool means, the relative sliding being itself caused by externally controlled axial movements of the rod. Such a valve preferably comprises a fixed valve housing having lands and grooves therein complementary to lands and grooves of spool means slidable therein, the spool means comprising two spool elements slidable co-axially relatively to a valve rod, which rod is slidable in the housing and is operable by external control, adjacent ends of said elements coacting as a valve to control fluid flow from a centre groove through a passage enclosed by the elements which passage interconnects other grooves.

The adjacent ends of the valve elements are ground or otherwise formed so that they constitute a seal against flow of the fluid; and radial clearance between the elements and the valve rod forms a fluid passage, into which the adjacent ends of the elements give communication (when these ends are apart). The adjacent ends may be formed so as to present (opposed) pressure areas so that fluid pressure external to the spool urges the elements apart; or such urging may be provided by a spring. Other features of the valve itself will be identified in the claims, as also is identified a system, which forms part of the invention.

A main feature of the present invention resides in a spool valve of which the landed and grooved spool is movable on a valve rod and by such relative movement opens and closes a fluid passage which runs at least from one of the valve grooves to at least one other. Preferably, the spool valve itself is in two parts which are axially movable on a valve rod between such limits as to allow a gap between their adjacent ends, and the gap in itself forms a valve controlling the fluid passage. This is all so arranged that movement of the valve rod in either sense of direction entrains one or other of the two spool members, bringing it into gap-closure contact with the other member. The two members, when the valve is in its neutral condition, may be held apart by a spring, or their formation may be such that fluid-pressure urges them apart. Such valve when employed in the present context of steering gear, is preferably so arranged that its movements as a whole are governed by the sense and magnitude of operators' torque; to this end the valve rod may be operated by means such as those described in my U.S. patent application No. 698,490, filed Jan. 17, 1968. The spool-valve feature so stated preferably includes a spool valve having the usual hollow-cylinder housing with radial parts, a valve rod sliding axially therein, and two valve members each consisting of a hollow cylindrical member with external lands and grooves sliding on the rod, and in the median or "centre" groove of the valve the two members are separable, the gap between their ends (when separated) forming a fluid passage to connect that groove with two other grooves; when, by virtue of movement of the rod, the two members come together and the gap is closed, such passage is cut off and the two members collectively then act as a normal single spool.

In a steering system including such a valve, the invention provides a two-way hand pump (the operator's steering-wheel pump) connected to two grooves of the spool valve; a power pump delivering from a reservoir and through a non-return valve to the centre groove of the spool valve, a return pipe from an end groove of the valve to reservoir, and the usual two-way conduits from the valve to the double-acting steering motor. The end groove above-mentioned is the groove to which the centre groove connects when the two spool members are apart. This system, as well as the novel spool valve, will be better understood from the following description aided by the accompanying diagrammatic drawings.

In this, the two-way hand pump is indicated at 1, and it is to be understood that its driving spindle (in effect the steering column), has interpolated in it the torque-responsive means which operate the spool valve according both to sense and magnitude of driver's effort; such connection is diagrammatically indicated by the presence of the chain-line 2. The two pipes 3A, 3B, connect the pump 1 to the two inner grooves 4A, 4B of the spool valve, through the fixed valve housing 5. The two outer grooves 4C, 4D of the valve are connected by pipes 6A, 6B to the two sides of the double-acting ram-type steering motor 7. The valve unit comprises a rod 8 (connected as mentioned above to the hand-pump spindle) which is glanded (at 8A) into one end of the housing 5. On the rod 8, slidably mounted, are two valve members 9 and 10. These are hollow cylindrical members with external lands defining valve grooves, and being a close sliding fit within the usual lands of the housing 5. The axial freedom of movement of the members 9 and 10 is limited, at one end by a nut 11 on the end of the rod 8, and at the other end at 11B by a shoulder formed on the valve rod 8. The centre groove 11A of the valve connects by pipe 18, to the output side of the engine-driven power-assistance pump 12, which derives hydraulic fluid from a reservoir 13 to which a pipe 14 returns such fluid. The pipe 14 comes from an end groove 15 of the valve. In the centre groove 11A, the adjacent ends of the valve members 9 and 10 either contact or separate slightly (as drawn) forming a gap 16 which opens to a fluid passage 17 shown in broken line within the members 10 and 9; the passage 17 has openings 17A through the members 9 and 10, to the end groove 15 and to a corresponding end groove 15A at the other end of the valve. The passage 17 may be simply a large radial clearance between the rod 8 and the members 9, 10 as shown (in which case these members depend entirely for their sliding guidance on their fit in the housing 5) or the passage 17 may be formed by one or more longitudinal grooves or bores in the rod 8. The meeting ends of the members 9, 10 which when apart form the gap 16, are made to fit closely, as by grinding them complementarily; or there may be a seal of an appropriate hard sealing material, to seal the closure of the gap against pressure fluid flow.

When the valve members are in the neutral position as drawn (respectively abutting nut 11 and shoulder 11B), flow from pump 12 passs through the gap 16 and so back to the reservoir 13 via 17, 17A, 15, 14. In this condition the hand pump 1 is directly connected to motor 7 via 3A, 4A, 6A and via 3B, 4B, 6B. Manual steering is now effective and road-wheel feedback to the driver is direct, so that he receives "feel." When the steering torque reaches a predetermined minimum, the mechanical "link" represented by line 2 is effective, and rod 8 is moved in corresponding sense and to corresponding extent. Let us suppose that valve movement is to the right in the drawing. Member 9, abutted by nut 11, is moved to the right closing the gap 16. Simultaneously groove 4A is opened to 11A, and 4C opened to 15A; whilst 4A is cut off from 4C. Therefore, pressure fluid from the power pump 12 is directed via 3A, to and through hand pump 1, which meters it (or aids it) through 3B, 4B, 6B to the motor 7, whereby power assistance is afforded, fully under driver's control. Exhaust from motor 7 is via 6A, 4C, 15A, 17A, 17, 15, 14, back to reservoir. Thus power assistance is afforded in one sense; it is obvious that the opposite sense is provided for in exactly the converse way.

Whilst there may be provided a spring S to urge members 9 and 10 apart, it will be noted from the drawing that the gap 16 is actually formed by a waisted or recessed annulus; and pressure in 11A therefore tends to separate the members and thus to open the gap 16. This may suffice but the individual design conditions, anticipated friction, and other factors, will determine whether or not a spring is required. The line 14 is connected by a branch pipe 18B to line 18, through a non-return valve 18B. This is to deal with the case of engine-driven pump failure, i.e. reversion to purely manual control. In such case line 14 may be subject by the action of the hand pump to a substantial depression and, sucking through the engine-driven pump, may produce cavitation in the fluid. The presence of the valve 18B ensures that if such suction occurs fluid will be drawn back through line 14 from the reservoir rather than through the (presumed failed) engine driven pump.

It will have been appreciated that the spool valve itself could be applied to systems other than power-steering or like controls. For example, it may be used in a hydraulic system having two power pumps in parallel, perhaps one of low pressure high volume, backed up by a second one of high pressure low volume. Such systems are encountered in various hydraulic operation system such as those of heavy duty earth-shifters, hoists, etc., and it is believed that the split valve above described may be advantageously adapted for use therein. In a considerably different variant within the invention, the spool valve consists of one single element replacing members 9 and 10, and this single element is slidable on the valve rod; one or more ports in the elements register with bores in the rod (which in this case is a tube) when the valve is neutral, but such ports cut off when the element is shifted relatively to the rod.

I claim:

1. A spool valve comprising a fixed valve housing having lands and grooves therein complementary to lands and grooves of spool means slidable therein, in which the spool means is relatively slidable on a valve rod which is itself borne for sliding in the housing, and by such relative sliding controlling fluid flow between grooves of the valve and a passage within the spool means, the relative sliding being itself caused by externally controlled axial movements of the rod.

2. A spool valve comprising a fixed valve housing having lands and grooves therein complementary to lands and grooves of spool means slidable therein, the spool means comprising two spool elements slidable coaxially relatively to a valve rod, which rod is slidable in the housing and is operable by external control, adjacent ends of said elements coacting as a valve to control fluid flow from a centre groove through a passage enclosed by the elements which passage interconnects other grooves.

3. A spool valve according to claim 2 in which the said adjacent ends of the spool elements are so formed as to present axially effective pressurised areas so that fluid pressure urges said elements axially apart.

4. A spool valve according to claim 2 in which the said adjacent ends of the spool elements are urged apart by a spring.

5. A spool valve according to claim 2 in which abutment means on the rod engage one or other spool element to move such element in one sense of direction when the rod is so moved, the alternate element remaining stationary.

6. A spool valve according to claim 5 in which the spool elements have their adjacent ends so formed as to constitute a fluid seal when urged together by abutment engagement by the rod.

7. A hydraulic power-assisted steering system including a reversible-output hand pump, a power pump, a control valve, a double acting servomotor and hydraulic circuitry operatively interconnecting said pumps, said control valve and said servomotor, said control valve comprising a valve housing, a valve member in said housing and a torque-responsive valve actuator operatively interconnecting said valve member and said hand pump, said valve member being movable from a neutral configurative relationship with said housing at which only said hand pump communicates with said servomotor to either of a pair of power configurative relationships with said housing at which said hand pump and said power pump communicate in series with each other and with said servomotor, said valve member having motive surfaces formed thereon in communication with said power pump for hydraulically biasing said valve member to said neutral configurative relationship with said housing said valve actuating means being effective to move said valve member from said neutral configurative relationship to either one or the other of said power configurative relationships depending upon the sense of direction of operation of said hand pump only in response to the sense and magnitude of a torque acting on the hand pump.

8. The hydraulic power assisted system as defined in claim 7 wherein said valve member comprises a pair of axially aligned and relatively shiftable spool valves having motive surfaces formed thereon in communication with said power pump and wherein said valve actuating means comprises an axially shiftable control rod and means on said rod for alternatively shifting each of said spool valves relative to one another as said control rod is shifted in opposite senses of direction.

9. A power-assisted steering or like control system according to claim 7 in which a non-return valve is provided to avoid sucking of fluid through the engine-driven pump.

10. A spool valve to control the operative sense of direction of a reversible power-fluid circuit comprising a valve housing having a bore formed with lands and grooves and fluid connections to its grooves; a valve rod sealedly slidable in said housing through its bore, and two spool valve elements having external lands and grooves formed thereon to co-operate with those of said bore, which elements are themselves slidable both in the bore and on said valve rod and which have their respective adjacent ends co-operative to form a fluid seal when they contact.

11. A spool valve according to claim 10, in which said valve rod has axially spaced stops effective to the valve elements, between which stops said valve elements are slidable, which stops are spaced by a distance greater than the sum of the axial lengths of the valve elements.

12. A spool valve according to claim 10, in which axially directed force is exerted on said valve elements tending to separate them and thereby to form a gap between their adjacent ends.

13. A spool valve according to claim 10 comprising two identical spool elements arranged slidably in the valve housing and having radial clearance from the valve rod thus forming a fluid passage, the elements having radial ports from such passage to grooves of the valve.

14. A power steering system including a reversible handpump, a power pump, a control valve, a servomotor and hydraulic circuitry operatively interconnecting said pumps, said control valve and said servomotor, said control valve comprising a bored housing, a pair of axially aligned- relatively axially shiftable spool valves in the bore of the housing and a torque-responsive valve actuating means operatively interconnecting said spool valves and said hand pump, said spool valves being movable from a neutral configurative relationship with each other and with said housing at which only said hand pump communicates with said servomotor to either of a pair of power configurative relationships at which said hand pump and said power pump communicate in series with each other and with said servomotor, said control valve including means in said housing biasing said spool valves to said neutral configurative relationship, said valve actuating means being effective to move said spool valves from the neutral configurative relationship thereof alternatively to either one of said power configurative relationships depending upon the direction of operation of said hand pump only when the torque acting on the hand pump exceeds a level sufficient to overcome the force of said biasing means.

15. The hydraulic power-assisted steering system as defined in claim 14 wherein said biasing means comprises spring means acting on said spool valves.

16. The hydraulic power-assisted steering system as defined in claim 14 wherein said biasing means comprises a pair of oppositely facing motive surfaces formed respectively on said spool valves and means communicating said motive surfaces with said power pump.

References Cited

UNITED STATES PATENTS

| | | |
|---|---|---|
| 2,968,316 | 1/1961 | Schultz. |
| 3,078,873 | 2/1963 | Stockett _____ 137—625.67 |
| 3,246,472 | 4/1966 | Kries. |
| 3,333,416 | 8/1967 | Budzich. |

EDGAR W. GEOGHEGAN, Primary Examiner

U.S. Cl. X.R.

137—596, 625.68